United States Patent
Wittkopp

(10) Patent No.: US 6,276,660 B1
(45) Date of Patent: Aug. 21, 2001

(54) ROTARY PISTON ACTUATOR WITH SELECTIVE ONE-WAY WRAPPED SPRING CLUTCHES

(75) Inventor: Scott Henry Wittkopp, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/456,479

(22) Filed: Dec. 7, 1999

(51) Int. Cl.[7] ................................................ F16K 31/12
(52) U.S. Cl. ............................ 251/59; 251/77; 251/313
(58) Field of Search ................................ 251/58, 59, 77, 251/313

(56) References Cited

U.S. PATENT DOCUMENTS

| | | | |
|---|---|---|---|
| 2,829,748 | 4/1958 | Sacchini et al. | 192/26 |
| 2,855,615 | 10/1958 | Sacchini et al. | 10/136 |
| 2,878,914 | 3/1959 | Worst | 192/81 |
| 2,881,640 | 4/1959 | Chambers | 74/681 |
| 2,885,896 | 5/1959 | Hungerford, Jr. et al. | 74/217 |
| 2,886,985 | 5/1959 | Meyer | 74/780 |
| 2,951,568 | 9/1960 | Hungerford, Jr. et al. | 192/81 |
| 2,968,380 | 1/1961 | Sacchini et al. | 192/81 |
| 3,026,739 | 3/1962 | Hungerford, Jr. et al. | 74/368 |
| 3,110,192 | 11/1963 | Hood | 74/368 |
| 3,393,779 | 7/1968 | Sacchini et al. | 192/26 |
| 3,451,512 | 6/1969 | Sacchini et al. | 192/12 |
| 3,465,857 | 9/1969 | Baer | 192/36 |
| 3,529,703 | 9/1970 | Kroeker | 192/26 |
| 3,555,919 | 1/1971 | Odell | 74/355 |
| 4,380,325 | * 4/1983 | Palmer | 251/59 |
| 4,986,400 | 1/1991 | Heller | 192/26 |

* cited by examiner

Primary Examiner—Kevin Shaver
Assistant Examiner—D. Austin Bonderer
(74) Attorney, Agent, or Firm—Laura C. Hargitt

(57) ABSTRACT

A pair of rotary pistons each have a drive shaft connectable therewith through respective one-way mechanisms. Each of the clutch mechanisms has a wrapped spring member surrounding the shaft and a linearly moveable piston to effect an operative connection between the wrapped spring and the shaft. Each linearly moveable piston controls fluid flow to one of the rotary pistons such that the linearly moveable piston will enforce actuation of the wrapped spring prior to the introduction of fluid pressure at the respective rotary piston.

6 Claims, 3 Drawing Sheets

ROTARY PISTON ACTUATOR WITH SELECTIVE ONE-WAY WRAPPED SPRING CLUTCHES

TECHNICAL FIELD

This invention relates to piston actuators and more particularly to rotary pistons having a selective attachment to a shaft.

BACKGROUND OF THE INVENTION

Rotary control valves have a shaft member that is driven rotatably to position the valve control member in the proper position for the requested function. Rotary valves have been proposed for use in automatic shifting power transmissions to control the position of the manual control valve during operation of the transmission. For example, the valve control member has a reverse position, a neutral position and a plurality of forward drive positions. The control member has to respond to both clockwise and counterclockwise rotary input commands.

In one control system, the piston has a pair of one way clutch members disposed between a shaft and the piston to effect a drive connection therebetween depending on the desired direction of rotation. The one-way mechanisms are hydraulically actuated to establish a drive connection and both must be released to permit the piston to return to a central position. In another rotary valve system the piston is driven to specific stops by the hydraulic control. This requires a number of hydraulic control ports to support each stop position or a piston having multiple components. A hydraulic control system having a single control piston is described in U.S. Ser. No. 09/105,405 filed Jun. 26, 1998 and assigned to the assignee of this application.

SUMMARY OF THE INVENTION

It is an object of the present invention to provide an improved rotary drive system having one-way drive mechanisms.

In one aspect of the present invention, a pair of selectively energizable clutch members are disposed between respective pistons and a rotary shaft member. In another aspect of the present invention, the selectively energizable clutch members are one-way mechanisms. In yet another aspect of the present invention, the one-way mechanisms each include a wrapped spring clutch.

In still another aspect of the present invention, respective linearly moveable hydraulic pistons are selectively pressurized to actuate the one-way mechanisms. In a further aspect of the present invention, rotary pistons are disposed for fluid communication with respective ones of the linearly moveable pistons. In a yet further aspect of the present invention, the linear piston is moved to energize the respective one-way mechanism prior to the admission of hydraulic fluid to the respective rotary piston.

In a still further aspect of the present invention, each piston is comprised of two components with a lost motion connection therebetween which permits one component to have a longer linear travel. In a yet still further aspect of the present invention, the shorter traveling component engages a wrapped spring clutch to provide an anchor point and the longer traveling component controls fluid flow to the actuator piston.

DESCRIPTION OF EXEMPLARY EMBODIMENTS

Figure 1:
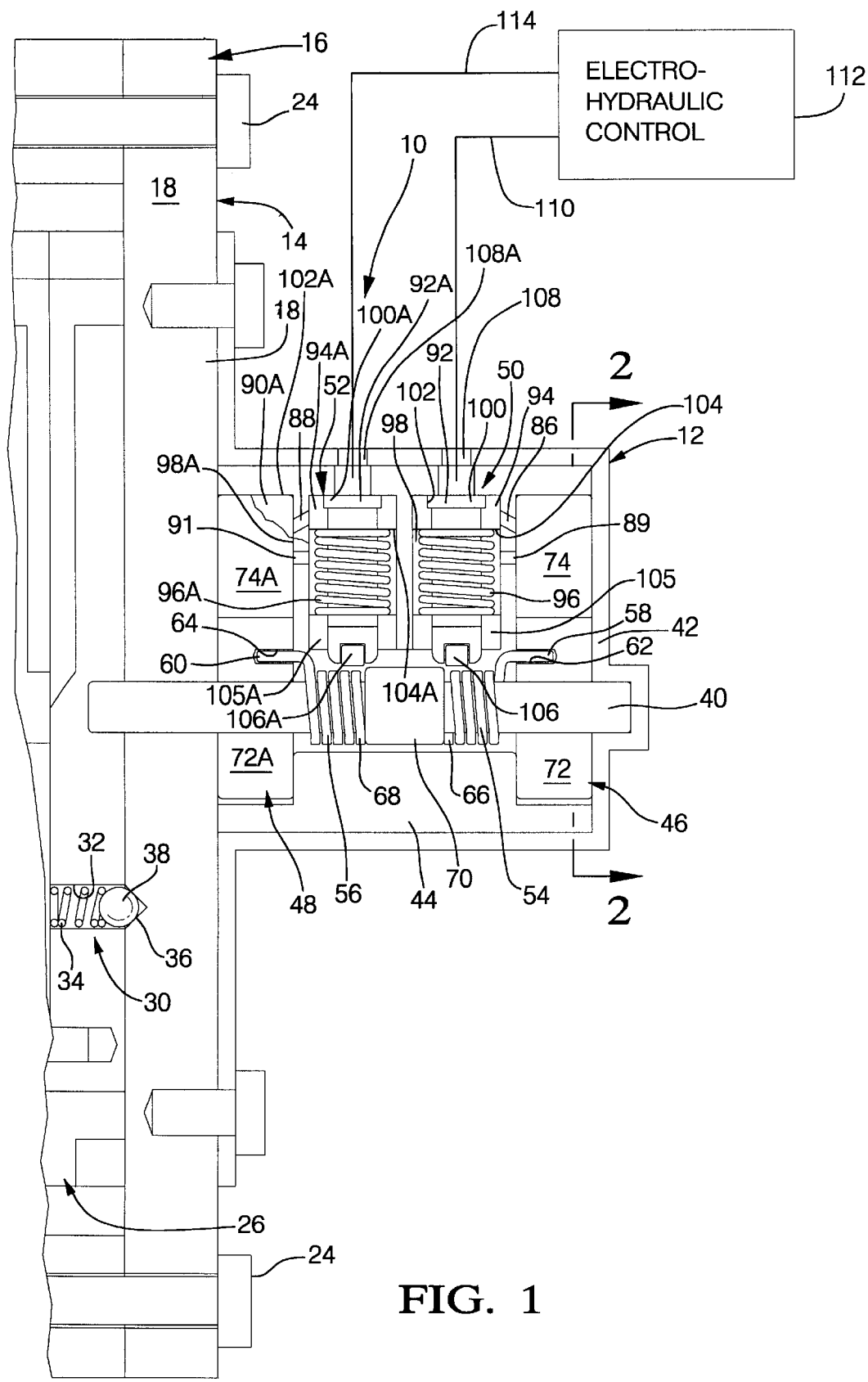
FIG. 1 is a sectional elevation view of a valve and control incorporating one embodiment of the present invention.
Figure 2:
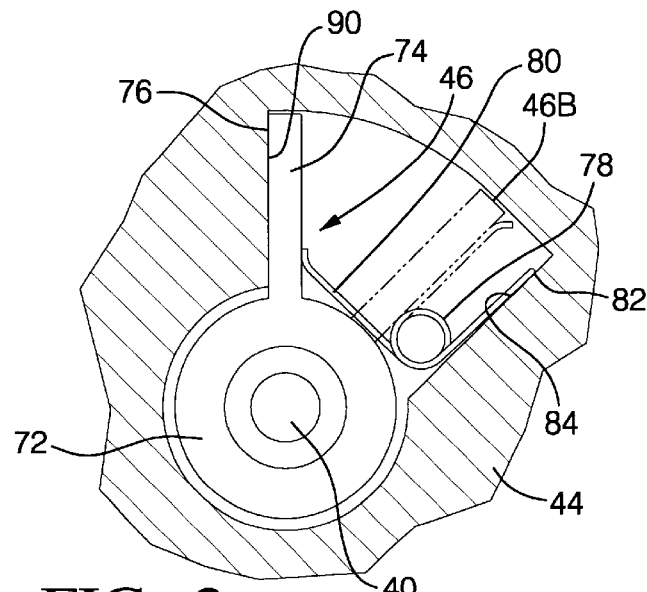
FIG. 2 is a view taken along line 2—2 in FIG. 1.

Referring to the drawings wherein like characters represent the same or corresponding components, there is seen in FIGS. 1 and 2 a valve and control assembly 10 comprised of a control assembly 12 and a valve assembly 14. The valve assembly 14 includes a housing 16 consisting of spaced plates 18 and 20 and an annular separator 22. The plates 18, 20 and the separator 22 are joined by a plurality of fasteners 24. An internal plate valve 26 is rotatably mounted between the plates 18 and 20.

A plurality of ports 28 are formed in the plate 20. The ports 28 supply hydraulic fluid to and direct hydraulic fluid from the valve assembly 14 in a well known manner. The valve assembly 14 is useful in controlling the operating condition of an automatically shifting power transmission, not shown. The internal plate valve 26 must be moveable to a plurality of operating positions and also be held at those positions for a period of time depending on the operating sequence. To hold the plate valve 26 at the desired positions, a detent mechanism 30 is provided. The mechanism 30 includes a pocket 32, formed in the plate valve 26, a spring 34, positioned in the pocket, a plurality of sockets 36, formed in the plate 18, and a ball 38 urged into respective ones of the sockets 36 by the spring 34 in a well-known manner. The valve assembly 14 may be constructed similar to the structure shown in U.S. Ser. No. 09/105,405 filed Jun. 26, 1998. Other rotary valve structures can also be accommodated by the present invention. The plate valve 26 is drivingly connected with a shaft 40 which is a component of the control assembly 12.

The control assembly 12 includes a cover 42, a housing 44, a pair of rotary pistons 46, 48 a pair of actuator assemblies 50 and 52 and a pair of coil springs 54, 56. The coil springs 54, 56 are disposed helically circumjacent and radially spaced from portions of the shaft 40. Each spring 54, 56 has a respective tab end 58, 60 that engage in pockets 62, 64 formed in the pistons 46 and 48 respectively. Each coil spring 54, 56 has a free end 66, 68 that are separated by a collar 70 fastened to the shaft 40. Since each spring 54, 56 has a slight radial clearance with the shaft 40, they are not self energizing. The spring 54 has a right hand helix and the spring 56 has a right hand helix.

The rotary piston 46 has a hub portion 72, rotatably supported on the shaft 40 and a paddle portion 74. The paddle portion 74 is disposed in an arcuate chamber 76 formed by the cover 42 and the housing 44. A torsion spring 78 that has one leg 80 abutting the paddle portion 74 and another leg 82 abutting a wall 84 of the chamber 76. The rotary piston 48 is identical with the rotary piston 46 such that the corresponding parts have been given the same numeric designation with an "A" suffix. The chamber 76A is formed by the housing 42 and the plate 18. The chambers 76 and 76A are in fluid communication with respective passages 86 and 88 formed in the housing 44. The passages 86 and 88 provide communication for the ingress of fluid between the paddle portion 74, 74A and respective walls 90 and 90A of the chambers 76 and 76A. Passages 89 and 91 provide for the exhausting of fluid from the chambers 76 and 76A.

The actuator assemblies 50 and 52 are identical and only the structure of the actuator assembly 50 will be described. The actuator assembly 50 has an actuator piston 92, a control piston 94, and a bias spring 96. The control piston 94 is slidably disposed on the actuator piston 92 and in a chamber or bore 98 formed in the housing 44. The actuator piston 92 has a head portion 100 that is disposed to be positioned in a recess 102 formed in the control piston 94 to limit the relative motion between the pistons 92 and 94. The control piston 94 can move downward, as viewed in FIG. 1, relative to the actuator piston 92.

The bias spring 96 is compressed between a wall 104 of the control piston 94 and a plug 105 secured in the housing 44. The plug 105 has a central opening through which the actuator piston 92 extends. The plug 105 slidably supports the actuator piston 92. The bias spring 96 urges the control piston upward in the chamber 98 and, when the head portion 100 is disposed in the recess 102, the actuator piston 92 is urged upwardly also. The actuator piston has rotatably supported thereon a roller 106 that is aligned to contact the end 66 of the coil spring 54 to enforce frictional engagement or contact between the coil spring 54 and the shaft 40.

The chamber 98 is in fluid communication with a passage 108 formed in the housing 44 and cover 42. The passage 108 is connected with a hydraulic line 110 that is connected with a conventional electro-hydraulic control 112. The electric-hydraulic control 112 preferably includes an electronic control unit that incorporated a preprogrammed digital computer. The control 112 establishes the pressure level in the line 110 and also distributes pressurized fluid to components of a conventional power transmission, not shown. The passage 108A is connected with the control 112 through a hydraulic line 114.

In the position shown, both of the actuator assemblies 50 and 52 are in the unactuated position. To cause clockwise rotation of the shaft 40, and therefore the plate valve 26, the line 110 is pressurized by the control 112. The pressure in the line 110 and the passage 108 will cause both the actuator piston 92 and the control piston 94 to move downward in the bore 98 until the roller 106 contacts the spring 54 and enforces contact therewith. This provides a reaction anchor at the end 66 of the spring 54. At this point, the piston 92 will be halted but, due to the lost motion mechanism provided by the spring 96, the piston 94 will continue to move relative to the piston 92.

The control piston 94 will open the chamber 98 to the passage 86 and thereby admit fluid pressure to the chamber. The pressure in chamber 76 will act on the paddle 74 to cause the piston 46 to rotate. The tab end 58 is driven by the piston 46 causing the spring 54 to contract to wrap down on and frictionally engage the shaft 40 such that the shaft 40 and the plate valve 26 are also rotated. The piston 46 will rotate to the pressure set dashed position 46B, shown in FIG. 1 resulting in a new operating position for the plate valve 26 where the detent 30 will hold the plate valve 26. The rotary travel of the pistons 74 and 74A is limited to the arcuate space provided by the chambers 90, 90A and the respective torsion springs 78.

The pressure in the chamber 76 is then reduces such that the piston 46 can return to the spring set position. When the piston 46 is in the spring set position, the pressure in the chamber 98 will be sufficiently reduced to permit the pistons 94 and 92 to return to the spring set position under the influence of the torsion spring 78 and the fluid in the chamber 76 will exhaust through the passage 89. The piston 46 is rotated in the opposite sense while returning to the spring set position therefore, the spring 54 will unwrap thereby permitting the piston 74 to rotate free from the shaft 40. Thus the coil spring 54 acts as a one-way clutch. To move the plate valve 26 to the next clockwise position, the line 110, passages 108 and 86 are repressurized by the control 112. To rotate the shaft 40 and the plate valve 26 in the opposite or counterclockwise direction, the hydraulic line 114 is pressurized. This will result in the actuator piston 92A being moved into abutment with the spring 56 and the control piston 94A being sequentially actuated such that the chamber 76A is pressurized through the passage 88 and the shaft 40 is driven counterclockwise by the piston 74A and the spring 56. When the pressure in the passage 108A is released, the piston 74A will return to the spring set position while the fluid in the chamber 76A is exhausted through the passage 91.

From the above description it should now be apparent to those skilled in the art that the shaft 40 and plate valve 26 can be controlled for rotation to a plurality of operating positions in both the clockwise and counterclockwise directions.

Figure 3:
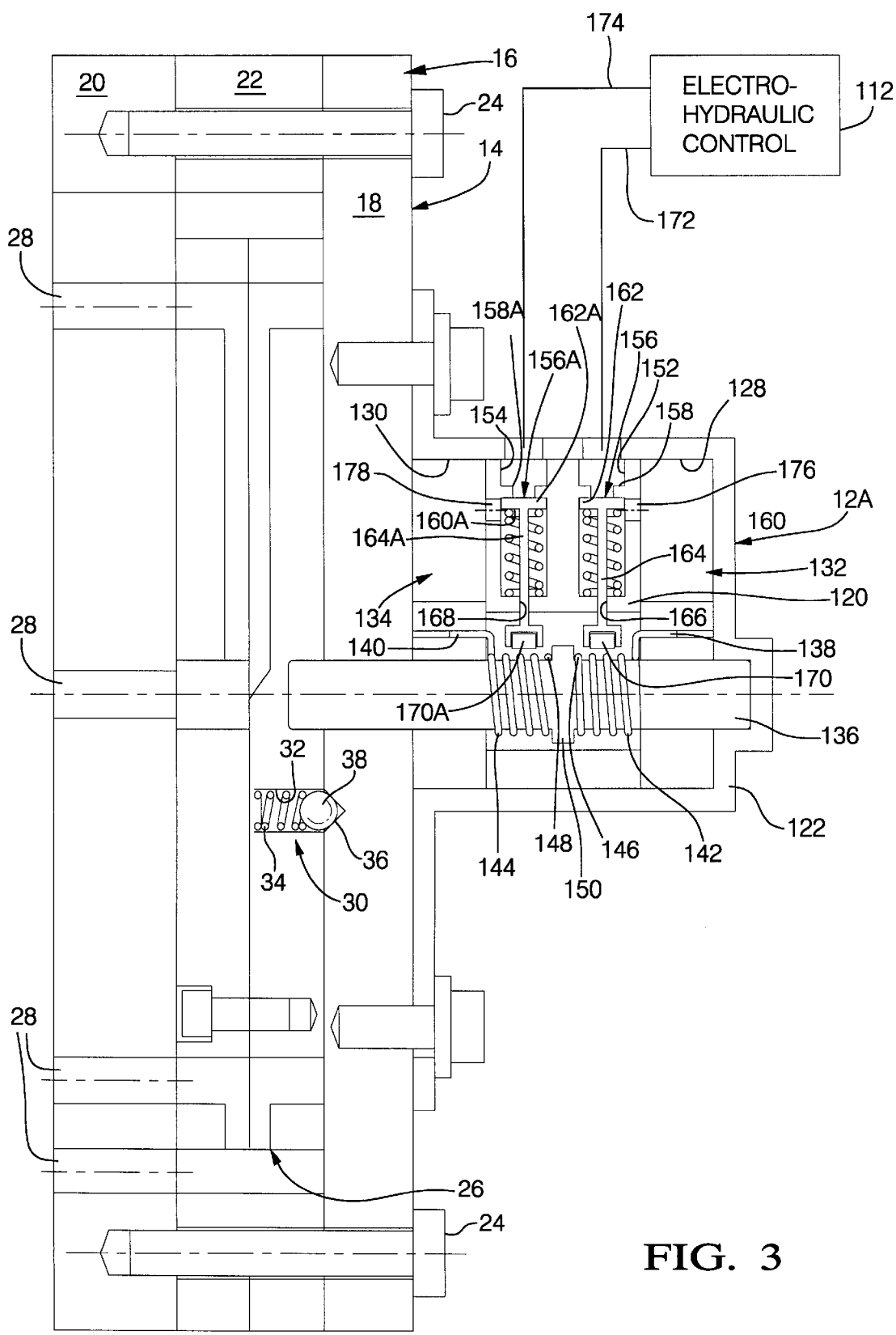
FIG. 3 is a sectional elevational view of a valve and control incorporating another embodiment of the present invention.

The embodiment shown in FIG. 3 is similar to the embodiment described in FIGS. 1 and 2 with the exception of a modification to the control assembly 12A. The assembly 12A includes a housing 120 enclosed by a cover 122. The housing 120 cooperates with the cover 122 and the plate 18 to form respective chambers 128 and 130 in which a pair of rotary piston 132 and 134 are disposed for rotation on a shaft 136 which is connected with the plate valve 26. Each piston 132, 134 is drivingly connected with a respective tab end 138 and 140 of coil springs 142 and 144. Each spring 142, 144 has a respective free end 146 and 148 that are limited in axial movement by a collar 150 formed on the shaft 136. The spring 142 has a right hand helix and the spring 144 has a right hand helix.

The housing 120 has two bores 152, 154 in each of which is slidably disposed an actuator and control piston 156, 156A. An annular stop surface or locating ring 158, 158A limits the upward movement of each piston 156, 156A in the respective bores 152, 154. The pistons 156, 156A are urged toward the respective stop surfaces 158, 158A by springs 160, 160A. Each piston 156, 156A has a head end 162, 162A, slidably disposed in the respective bore 152, 154, a stem portion 164, 164A slidably disposed in a respective openings 166, 168 formed in the housing 120.

Each stem portion 164, 164A has a roller assembly 170, 170A supported thereon. The roller assembly 170 is aligned to contact the free end 146 of spring 142 and the roller assembly 170A is aligned to contact the free end 148 of the spring 144. Each bore 152, 154 communicates through respective passages 172, 174 with the electro-hydraulic control 112. The chamber 128 and the bore 152 are interconnected by a passage 176 that is closed by the head portion 162 when the actuator and control piston 156 is in the spring set position shown. The chamber 130 and the bore 154 are interconnected by a passage 178 that is closed by the head portion 162A when the actuator and control piston 156A is in the spring set position shown.

However, when the piston 156, is moved downward by pressure in the chamber 152, the roller assembly 170 will first anchor the spring 142; and then the piston 156 will open the passage 176 so that the piston 132 will be pressurized to enforce rotation of the spring 142, the shaft 136 and the plate valve 126 in the clockwise direction in a manner described above for FIG. 1. When the piston 156A, is moved downward by pressure in the chamber 154, the roller assembly 170A will first anchor the spring 142; and the passage 178 will then be opened and the piston 134 will be pressurized to enforce rotation the spring 144, the shaft 136 and the plate valve 126 in the counterclockwise direction in a manner described above for FIG. 1. The position of the stop surfaces 158, 158A, the thickness of the head portions 162, 162A and the position of the passages 176, 178 determine the opening of the chambers 128 and 130 for pressurization. The system is designed such that the rollers 170, 170a will contact the respective free ends 146, 148 simultaneously with or slightly prior to the passages 176 and 178 being opened. This will insure that the springs 142 and 144 are anchored before the pistons 132 and 134 begin to move.

Figure 4:
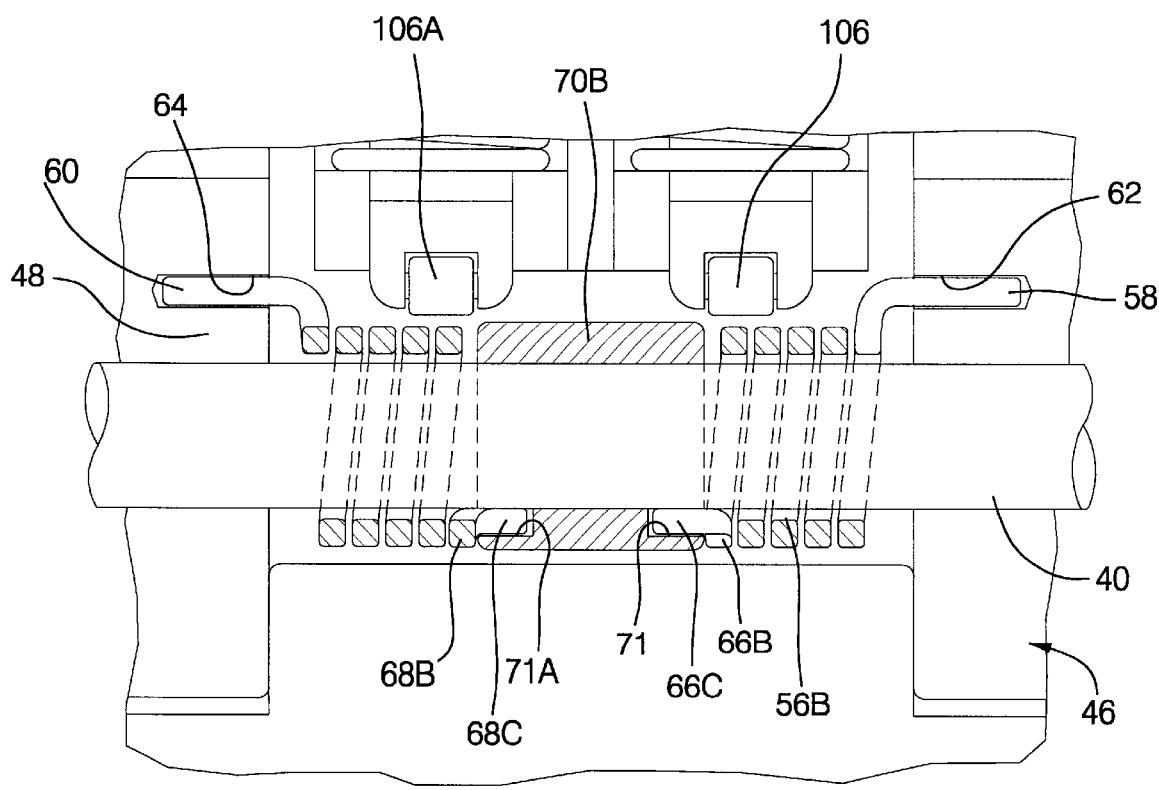
FIG. 4 is a partial view of an alternative embodiment of the spring clutch connections.

FIG. 4 describes an alternative connecting structure for the coil springs 54 and 56 in the form of springs 54B and 56B. The spring 54B has a free end 66B from which a tab 66C extends into a slot 71 formed in a collar 70B. The collar 77B is free to rotate relative to the shaft 40. The spring 56B has a free end 68B from which a tab 68C extends into a slot 71A formed in a collar 70B. The remaining components are same as those described for FIGS. 1 and 2. With the structure shown in FIG. 4, the spring 56B will unwrap as the spring 54B warps and vice-versa. The piston 74A will react against the wall 90A and a force will be stored in the spring 56B. This stored force will assist the torsion spring 78 in returning the piston 74 to the spring set position when the pressure in the passage 108 is relieved. Likewise when the piston 74A is actuated, the spring 54B will store a force which will assist in returning the piston 74A to the spring set position. If desired, the tabs 66C and 68C can be connected and the collar 70B can be eliminated. This will result in a single spring having a right hand helix portion and a right hand helix portion.

What is claimed is:

1. A rotary piston mechanism comprising:
    a first actuator mechanism having a lost motion means for permitting a first and a second travel motion;
    a second actuator mechanism having a lost motion means for permitting a first and a second travel motion;
    a first rotary piston;
    a second rotary piston;
    first fluid conducting means for communicating fluid between said first actuator mechanism and said first rotary piston and second fluid conducting means for communicating fluid between said second actuator mechanism and said second rotary piston;
    a rotary shaft member;
    a first spring member disposed helically circumjacent said shaft member and being drivingly connected with said first rotary piston, said first spring having a free end substantially aligned for contact by said first actuator mechanism;
    a second spring member disposed helically circumjacent said shaft member and being drivingly connected with said second rotary piston, said second spring having a free end substantially aligned for contact by said second actuator mechanism; and
    means for selectively pressurizing said first actuator mechanism to cause said first travel motion whereby said first actuator mechanism abuts said first spring member to enforce friction engagement between said first spring member and said shaft member and during said second travel motion to open said first fluid conducting means to initiate rotation of said first rotary piston, said first spring member, and said shaft member in a first rotary direction, and for selectively pressurizing said second actuator mechanism and to cause said first travel motion whereby said second actuator mechanism abuts said second spring member to enforce friction engagement between said second spring member and said shaft member and during said second travel motion to open said second fluid conducting means to initiate rotation of said second rotary piston, said first spring member, and said shaft member in a second rotary direction.

2. A rotary piston actuator apparatus comprising:
    a fluid pressure source;
    a shaft member;
    a first rotary piston rotatably supported on said shaft;
    a first spring clutch drivingly connected with said first rotary piston and having a portion disposed circumjacent said shaft;
    a first actuator mechanism including piston means for sequentially frictional engaging said spring clutch at an end circumjacent said shaft and controlling admission of pressurized fluid from said fluid pressure source to said first rotary piston to rotate said shaft in one direction;
    a second rotary piston rotatably supported on said shaft;
    a second spring clutch drivingly connected with said second rotary piston and having a portion disposed circumjacent said shaft; and
    a second actuator mechanism including piston means for sequentially frictional engaging said spring clutch at an end circumjacent said shaft and controlling admission of pressurized fluid from said fluid pressure source to said first rotary piston to rotate said shaft in another direction.

3. The rotary piston actuator apparatus defined in claim 2 further comprising:
    said first spring clutch having a right hand helix; and
    said second spring clutch having a right hand helix.

4. The rotary piston actuator apparatus defined in claim 2 further comprising:
    said first actuator mechanism piston means comprising a first piston for engaging said first spring clutch and a second piston for controlling fluid flow between said source and said first rotary piston; and
    said second actuator mechanism piston means comprising a first piston for engaging said second spring clutch and a second piston for controlling fluid flow between said source and said second rotary piston.

5. The rotary piston actuator apparatus defined in claim 4 further comprising:
    a rotary valve mechanism having a plate valve drivingly connected with said shaft for rotation in a first direction by said first rotary piston, said first spring clutch and said shaft, and for rotation in a second direction by said second rotary piston, said second spring clutch and said shaft.

6. A rotary piston apparatus comprising:
    a source of fluid pressure;
    a shaft member rotatably disposed in a housing;
    rotary actuator means rotatably supported on said shaft;
    spring means disposed helically circumjacent said shaft and comprising a first spring portion wrapped in a first direction and a second spring portion wrapped in the same direction;
    actuator means communicating with said source and being selectively pressurized thereby for sequentially enforcing frictional engagement of one of said spring portions with said shaft and communicating fluid from said source to said rotary actuator for rotating said shaft through said spring means in one of said first and second directions.

* * * * *